Figure 6:
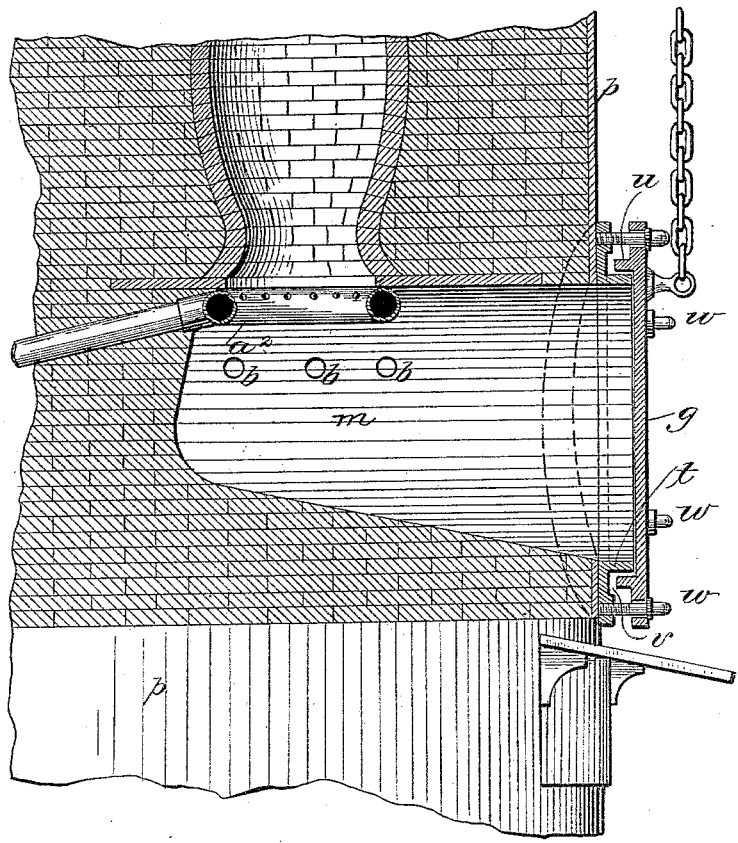

(No Model.) 3 Sheets—Sheet 1.
S. CABOT.
PROCESS OF AND APPARATUS FOR MAKING CARBON DIOXIDE.
No. 359,996. Patented Mar. 29, 1887.
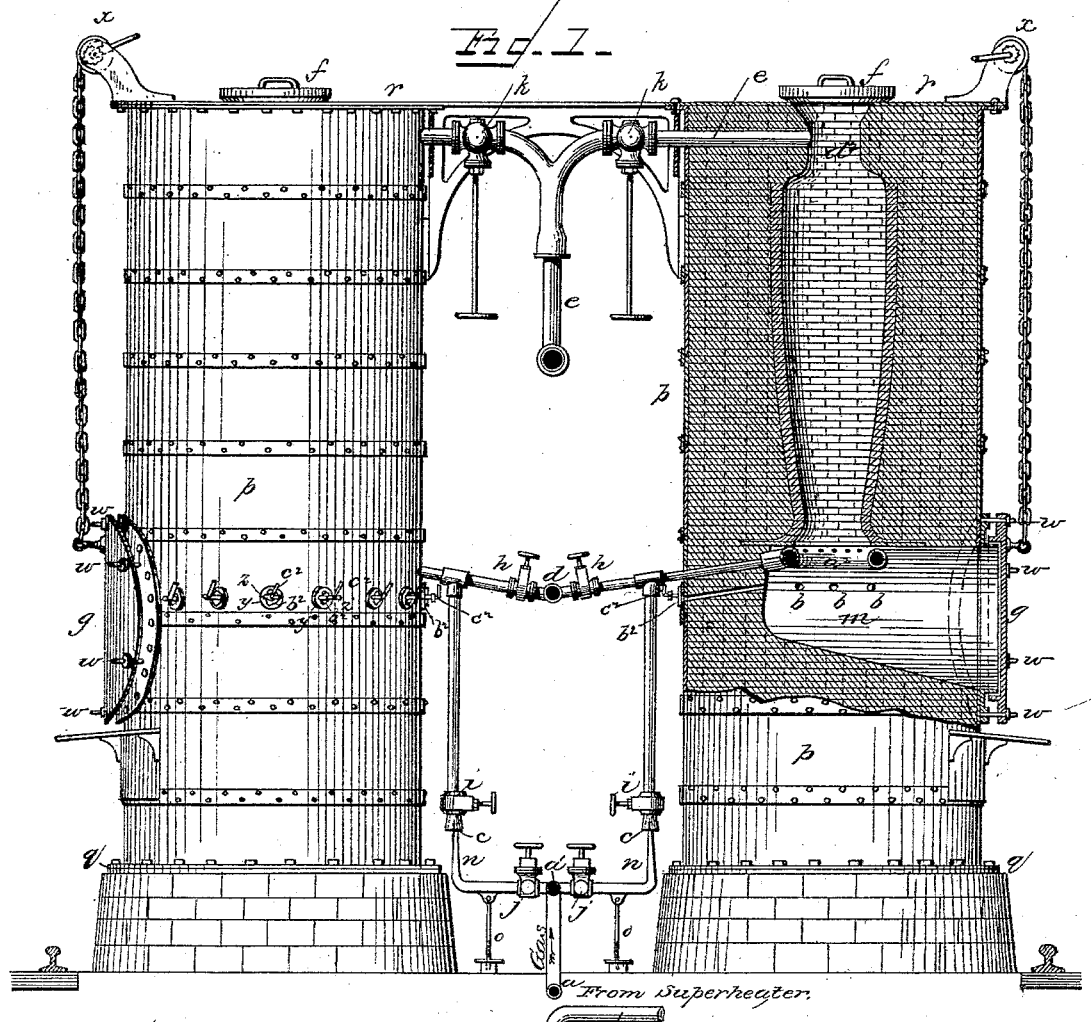
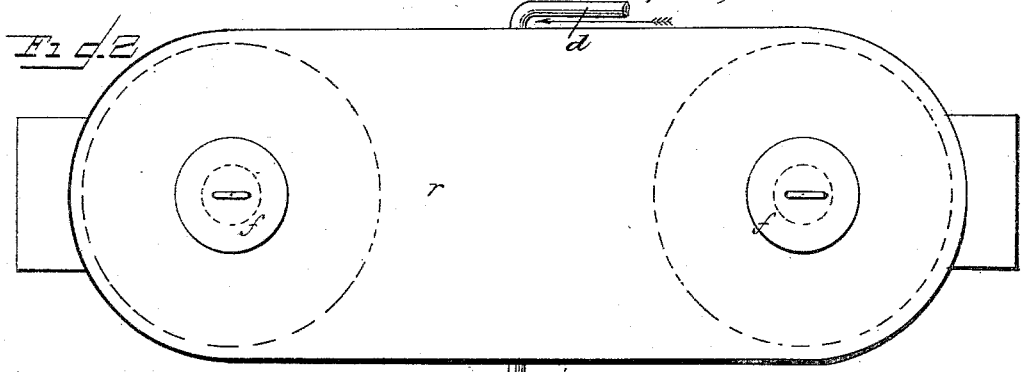
WITNESSES
F. L. Durand
W. E. Stearns
INVENTOR
Samuel Cabot
By J. W. Osborne
Attorney

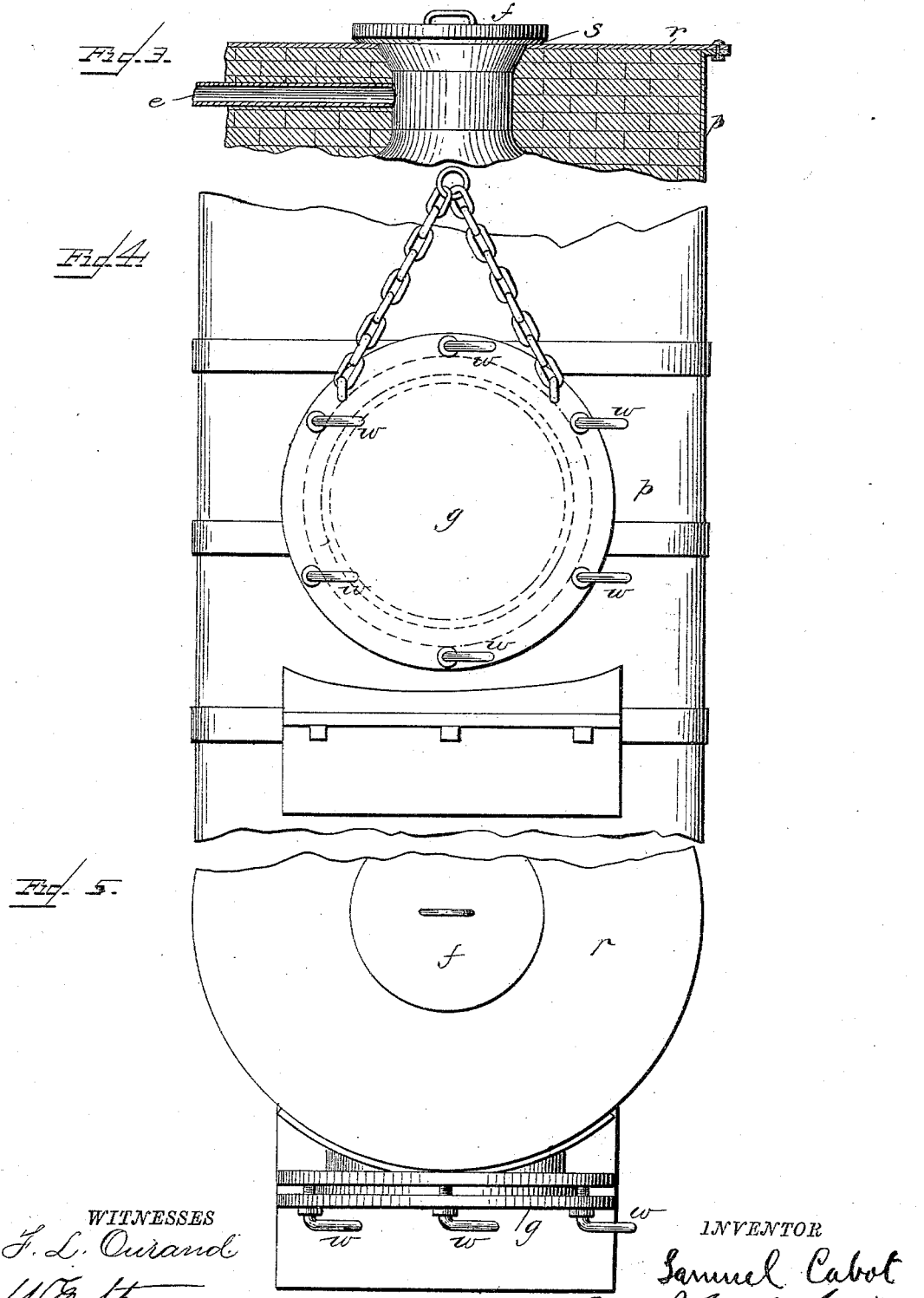

(No Model.) 3 Sheets—Sheet 3.

S. CABOT.
PROCESS OF AND APPARATUS FOR MAKING CARBON DIOXIDE.

No. 359,996. Patented Mar. 29, 1887.

INVENTOR
Samuel Cabot
J. W. Osborn
Attorney

UNITED STATES PATENT OFFICE.

SAMUEL CABOT, OF BOSTON, MASSACHUSETTS.

PROCESS OF AND APPARATUS FOR MAKING CARBON DIOXIDE.

SPECIFICATION forming part of Letters Patent No. 359,996, dated March 29, 1887.

Application filed July 15, 1886. Serial No. 208,164. (No model.)

*To all whom it may concern:*

Be it known that I, SAMUEL CABOT, a citizen of the United States, residing at Boston, in the county of Suffolk and State of Massachusetts, have invented certain new and useful Improvements in the Manufacture of Carbonic-Acid Gas, of which the following is a specification, reference being had therein to the accompanying drawings.

The object of my invention is the production of carbonic-acid gas in large quantities, of considerable purity, and at small cost. This gas is frequently made by the action of a stronger acid upon a carbonate, as in the manufacture of aerated waters; but in large manufacturing operations—such as the recovery of sulphur from soda waste, the making of carbonate of magnesia, of bicarbonate of soda, and in the ammonia-soda process—a much less costly method is indispensable. For this reason advantage has sometimes been taken of the fact that superheated steam passed over carbonate of lime while the latter is being heated causes a dislodgment of carbonic-acid gas. In such cases, however, the products of combustion of the fuel and atmospheric air became mixed with the carbonic-acid gas and the ultimate product was more or less impure. It has also been suggested to first heat carbonate of lime in retorts by fire surrounding the latter, and then admit steam into the retorts, which steam is superheated in the lower portions of the same and then rises into contact with the properly-heated carbonate of lime. By this process the ultimate product is obtained at a great and unnecessary expenditure of fuel, since the body of the retort must be heated to the same if not to a higher degree than the limestone. This process is also destructive to the apparatus, especially to the retorts, which are usually of cast-iron and are suspended from the top, and the great expense which this involves renders the process impracticable. I overcome these difficulties by the employment of my improved apparatus, by which I am enabled to apply the fire directly to the carbonate of lime within the retort or kiln, and I so manipulate the apparatus as to admit superheated steam after the fire has been removed. The carbonic-acid gas thus produced is exceedingly pure, the manipulation is simplified, and the process is rendered continuous.

The apparatus I employ consists, chiefly, of a peculiarly-constructed limekiln managed in a peculiar way, to be detailed hereinafter.

Two of such kilns, forming a pair, are shown, the one in vertical elevation and the other, of identical construction, in vertical section in Figure 1. In Fig. 2 the same are shown in plan, as seen from above. Figs. 3, 4, 5, 6, and 7 show on a large scale certain details of construction employed for closing the several openings of each kiln.

These kilns are charged from above with broken limestone, from which substance solely I obtain the carbonic-acid gas. The firing, in the construction shown, is effected by gas (preferably natural gas) emitted in large jets from an annular pipe, $a^2$, conducted from the gas-main $a$. Air to sustain combustion is admitted at the openings $b$ about the base of the kiln and at $c$. The tube $a^2$ is also used for the admission of steam at the proper time from the pipe $d$, which leads from a superheater. The large pipe $e$ issues from the upper part of the kiln and leads to an exhaust apparatus of any well-known construction, through which the carbon dioxide passes before use. A heavy plate, $f$, covers the top of the kiln, and a door, of iron, $g$, closes the large opening below, through which the burned lime is raked out into trucks provided for that purpose. The precautions observed in closing these several openings will be referred to hereinafter.

The letters $h$, $i$, $j$, and $k$ refer to valves for controlling the flow of the gases.

The large pipe $l$, with its connections, is that in which a condensation of water takes place, and is the main through which the pure carbon dioxide reaches the exhaust apparatus. (Erected at some distance, and not shown in the drawings.)

In carrying out my process one of these kilns is filled from above (the plate $f$ being dragged aside) with broken limestone, part of which, in the first instance, will fall through into the pit $m$ below, it will not be subjected to the treatment under my process, and be finally raked out unchanged; but subsequently all the lime which lies upon the hearth will have been thoroughly calcined, and is removed only when a portion in the lower part of the shaft is ready to take its place. Whenever a lot of quicklime is removed below, a corresponding quantity of broken limestone is added above, so that the shaft remains always filled to the same extent, and the kiln works continuously. When a fresh descent of quicklime has taken place, the door $g$ being tightly closed, the valves $h$ and $k$ are shut and $i$ and $j$ opened, whereby a flow of inflammable gas takes place from the openings (directed inward) in the annular pipe $a^2$, where it is then to be ignited. The nozzle at $n$ may be adjusted in position by the screw at $o$. It enters, but does not close, the flared pipe below the valve $i$, and consequently the gas, which is under considerable pressure, draws with it a large quantity of atmospheric air in the well-known way; but the annular space at $c$, about the nozzle $n$, is not large enough to admit so much air as to form an explosive mixture with the inflammable gas, and the rest of the air necessary for perfect combustion enters through the openings $b$. As the nozzle-tube governed by the screw $o$ swings sufficiently at $a'$ and the openings $b$ are all controlled by sliding plates, the combustion at the base of the kiln may be made perfect without a wasteful admission of air and without the formation of smoke. This firing is continued until the contents of the kiln, and especially those in its lower part, have been raised to a high temperature, and abundance of carbonic-acid gas with the other products of combustion make their appearance at the top of the shaft, and discharge into the air through the open top of the kiln. The firing is now to be stopped by closing the valves $i$ and $j$, and at the same time the air-holes $b$, Fig. 1. The heavy plate $f$ is to be drawn over the mouth of the kiln and cemented tight. The effect of the atmosphere of exceedingly hot steam which passes over the glowing limestone is, in accordance with a well-known law, to facilitate greatly the disengagement of the carbonic-acid gas, volumes of which in a condition of great purity will immediately make their appearance.

The kiln I have shown and described is so perfectly inclosed with boiler-iron $p$, well bolted to a substantial bed-plate below, $q$, and to a flat continuous iron platform, $r$, at the top, and its several openings admit of being closed and cemented so perfectly, that the exhaust-pump in connection with the large pipe $l$ may be made to lower the atmospheric pressure within the kiln very considerably, whereby the evolution of the gas is promoted in a high degree. This feature of my process is an important one, and it establishes a condition of things, when conjoined with the moving current of highly-superheated steam, which results not only in the abundant production of carbon dioxide, but also in the continuance of its disengagement when the temperature of the limestone has fallen very much lower than that at which the generation of gas ceases under ordinary circumstances.

To secure a supply of gas of the greatest purity, it is essential that no fuel of any kind should remain in the kiln, and it is for this reason that illuminating-gas, water-gas, and especially natural gas, are so well adapted for my purposes. With the same object in view it is also essential that atmospheric air be excluded. It is in consequence of the exceedingly pervious character of brick-work and masonry of all kinds (as well as of the soil itself on which foundations are laid) for atmospheric air and gases that I have invented this hermetically-inclosed kiln and given it the peculiarities herein described for the successful prosecution of my process. The chief advantage gained is the possibility of lowering greatly the pressure in the kiln; but its closing is almost equally important as the only way of insuring a pure gaseous product—that is, one free from atmospheric air. Before the exhaust apparatus is started, through which the evolved carbonic-acid gas is removed, together with the steam which accompanies it, the mouth of the shaft above, $d^2$, the opening below from which the quicklime is raked, and the air-holes $b$ have to be perfectly closed.

In Fig. 3 the heavy plate $f$ is shown on an enlarged scale. This is undercut around its edge at $s$, and when it is in position the joint between it and the platform-plate $r$ is made perfect by ramming in a suitable cement (generally fire-clay) in a soft state all round, under, and against the edge. This means of closing the mouth of the kiln has to be perpetually repeated after every charge. It has the advantage of requiring no construction calculated to interfere with the work done upon the platform.

The door $g$ is fully shown in Figs. 4, 5, and 6 in front elevation, plan, and vertical cross-section. It will be seen to consist of a circular plate, $g$, which covers a projecting rim, $t$, bolted to the iron casing of the kiln. The projection $u$ on the plate $g$ enters an annular recess, $v$, which is filled with suitable packing, (not shown,) such as asbestus prepared for like uses. When the clamping-screws $w$ are entered and drawn up, this packing is compressed and a tight joint secured. By means of the small winch $x$, with its connecting-chain, this heavy door may be readily lifted out of the way and as readily returned to its place when required.

Figure 7:
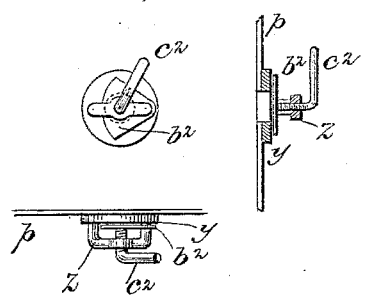

The three views embraced in Fig. 7 represent in front elevation, plan, and vertical cross-section the way in which I close the air-holes $b$, and also, when desirable, adjust the volume of air which passes through them to support perfect combustion. A cast-iron ring, $y$, provided with the bow $z$, is made fast to the outer shell of the kiln at each air-hole opening. The flat segment $b^2$ swings on one leg of the bow in such a way that its faced surface lies upon the projecting faced surface of the ring $y$.

It is evident that by means of the clamping-screw $c^2$ the segment $b^2$ can be held over the air-hole, so as to cut off all or part only of the air, which would be drawn through the latter if fully open. When the firing of a charge of limestone is in progress, the proper quantity of air can be determined by observing the character of the flame within through the air-holes.

When the temperature of the mass of glowing carbonate of lime falls to a certain extent under the action of the strongly-superheated steam at low pressure, the disengagement of the gas will decrease, and finally cease. This fact is speedily made manifest by the change in the exhaust-tension exerted on the kiln by the exhaust-pump and indicated by its gage. When this point is reached, the flow of steam must be stopped. If, then, the stratum of material acted upon in the lower part of the shaft has become good quicklime, it is caused to fall upon the hearth $m$ by raking out what is already below it; but if the lime is only partially burned, a second elevation of temperature by the combustion of gas, followed by the admission of steam, becomes necessary, so as to secure all the carbonic acid and obtain good caustic lime as a by-product, the value of which is considerable. The necessity for alternations of fire and steam will depend upon a number of variable circumstances, such as the quality of the limestone, of the inflammable gas used for fuel, the degree to which superheating is carried, and the intensity of the exhaust, &c. As the gaseous products from the kiln pass into the tube $l$ and toward the exhaust apparatus, they should consist of carbonic-acid gas and the vapor of water only. To eliminate the latter, if that is desired, it is only necessary to adopt any one of the many well-known cooling methods by contact of cold water, by evaporation, or by simply making the pipe $l$ long enough and drawing from it the condensed water at a convenient place. This last is the method presumed in the drawings, and it may in this connection be remarked that, in consequence of the very large amount of heat made latent by the disassociation of the carbonic acid and lime, the gaseous mixture as it leaves the kiln will be, comparatively speaking, cool. The quantity of steam employed should also be as small as possible, and at very low pressure, so that the actual amount of condensed water will be small.

The absence of common air, or nitrogen, or carbonic oxide from the gas I manufacture is a fact of great importance, for it is well known that at present the production of carbonic acid in large quantities from limestone and carbonaceous matter furnishes a gas diluted with many times its bulk of those impurities. Their presence and (in consequence of the room they occupy) the necessary enlargement and adaptation of the apparatus which deals with them for the sake of the available carbonic acid they contain add very decidedly to the cost of all technological operations based upon the absorption of the latter substance. This waste, depending on the presence of voluminous impurities, extends in some instances (as in the ammonia-soda process) to the loss of costly material, which passes off with the useless gases.

To make the flow of carbonic-acid gas by my process practically continuous, I employ two kilns, as in the drawings. These should be identical in construction and management; but they are used alternately as regards the intermittent heating and steaming of their contents—that is, while one is being fired up and is discharging into the air the other is receiving the superheated steam, into which the carbonic acid of the carbonate diffuses, and is discharging into the main $l$.

In this specification I have described a pair of kilns, each of which runs continuously; but it is evident that the management of the kiln in this respect is not an essential part of my process, and that like results may be obtained when one or more kilns are used in which the whole charge of limestone is burned and emptied before fresh material is added. In such cases, however, it will sometimes be necessary to run more than two kilns in rotation, so as to gain time for emptying, recharging, and firing up. In this regard that manner of working my process which is most desirable will depend upon the nature of the demand for carbonic acid in the technical process for which it is made—that is, whether it is wanting in very large quantities at intervals, or continuously and at a regular rate; and though in the foregoing I have spoken of gas as the fuel I employ, it is manifest that petroleum, &c., can also be burned in the way now well understood and practiced for furnace fires, or, to state the case generally, any fuel may be used which after the requisite temperature has been reached can be totally cut off and excluded from the red-hot charge within the kiln, over which the superheated steam is to pass; and though I prefer the use of the perforated annular tube $a^2$ both for gas and for steam as well, I do not regard that as the only good way of introducing those bodies into the kiln, for it is plain that they may be conducted to the proper place by independent pipes, and in like manner, though I believe the necessary supply of air to the kiln during the firing is best made by mixing part of it with the gas to be burned and supplying the rest as an atmosphere to support combustion; still very excellent results may be obtained by burning the gas without any such division of the total quantity of air; and though I have not shown or described any mechanical device—such as a blower or fan—to force gas or air into the kiln, I am fully aware that under certain circumstances such contrivances may be of great utility.

I do not claim, broadly, the application of steam for the dislodgment of carbonic acid.

In describing means for hermetically closing my kiln periodically I do not wish it to be understood that I regard the specific devices shown as the only ones suitable for the purpose, as there are an indefinite number of ways of doing the same thing satisfactorily. Some of these will cost less at first, but prove a source of constant expense in labor afterwards; but choice in such matters will be governed by the requirements and conditions affecting each particular case.

To instance the modifications which may be made, it is sufficient to point out that by letting a collar of thin boiler-iron project from the shell of the kiln at a little distance from the air-hole opening the latter can be effectually closed at any time by the insertion of a thin circular plate bedded and covered with fire-clay, and precisely the same principle may be applied to the large opening in the kiln from which the hot quicklime is discharged, using a thin curved plate, if necessary, to suit the curve of the shell; but under these circumstances it is evident the dry and hardened cement has to be scraped away every time one part of my process gives place to the other, and while the exhaust is on the kiln attention has to be constantly paid to the joints to prevent the inward leak of air through cracks caused by drying.

The essential condition, which in my process is imperative in whatever way it may be accomplished, is the possibility of absolutely closing the kiln, whereby atmospheric air is excluded and the requisite quantity of steam reduced to a minimum. This condition I believe it impossible to fulfill without giving the whole kiln everywhere a metal covering or shell such as I have described.

I am aware that plates and sheets of iron have been bolted to kilns and furnaces to give them strength and prevent dangerous fissures and cracks, and I do not claim, broadly, the application of metal plates in the construction of limekilns.

What I do claim, and desire to secure by Letters Patent, is—

1. The improvement in the art of making pure carbonic acid, which consists in first heating broken limestone to redness by the action of direct fire thereon and allowing the products of combustion to escape, then removing the fire, excluding the air and subjecting the hot limestone to a current of steam, and finally condensing said steam and removing it as water from the carbonic-acid gas evolved, substantially as described.

2. In the manipulation of calcium carbonate for the production of carbonic acid and quicklime, the alternate treatment of said carbonate with the gaseous products of combustion at a high temperature and with superheated steam until its carbonic acid is expelled, substantially as and for the purpose described.

3. The improvement in the art of making carbonic-acid gas, which consists in reducing the atmospheric pressure, and of maintaining this reduced pressure upon an incandescent mass of broken limestone pending the passage of superheated steam over the same, substantially as and for the purpose described.

4. In a limekiln for making carbonic acid, a perforated tube, as $a^2$, adapted for distributing combustible gas and superheated steam alternately, connections thereof, respectively, with tubes conveying gas and steam, as $a$ and $d$, means for the intermittent admission of air when required to support combustion, and means for hermetically closing the kiln and for exhausting it when so closed by an air-pump or equivalent device, substantially as shown and described.

In testimony whereof I affix my signature in presence of two witnesses.

SAMUEL CABOT.

Witnesses:
CHAS. P. NICHOLS,
T. F. ROBINSON.